May 21, 1957  E. A. MEYER  2,793,071
WINDOW CLIP ASSEMBLY FOR AUTOMOTIVE VEHICLES
Filed Nov. 29, 1954  2 Sheets-Sheet 1
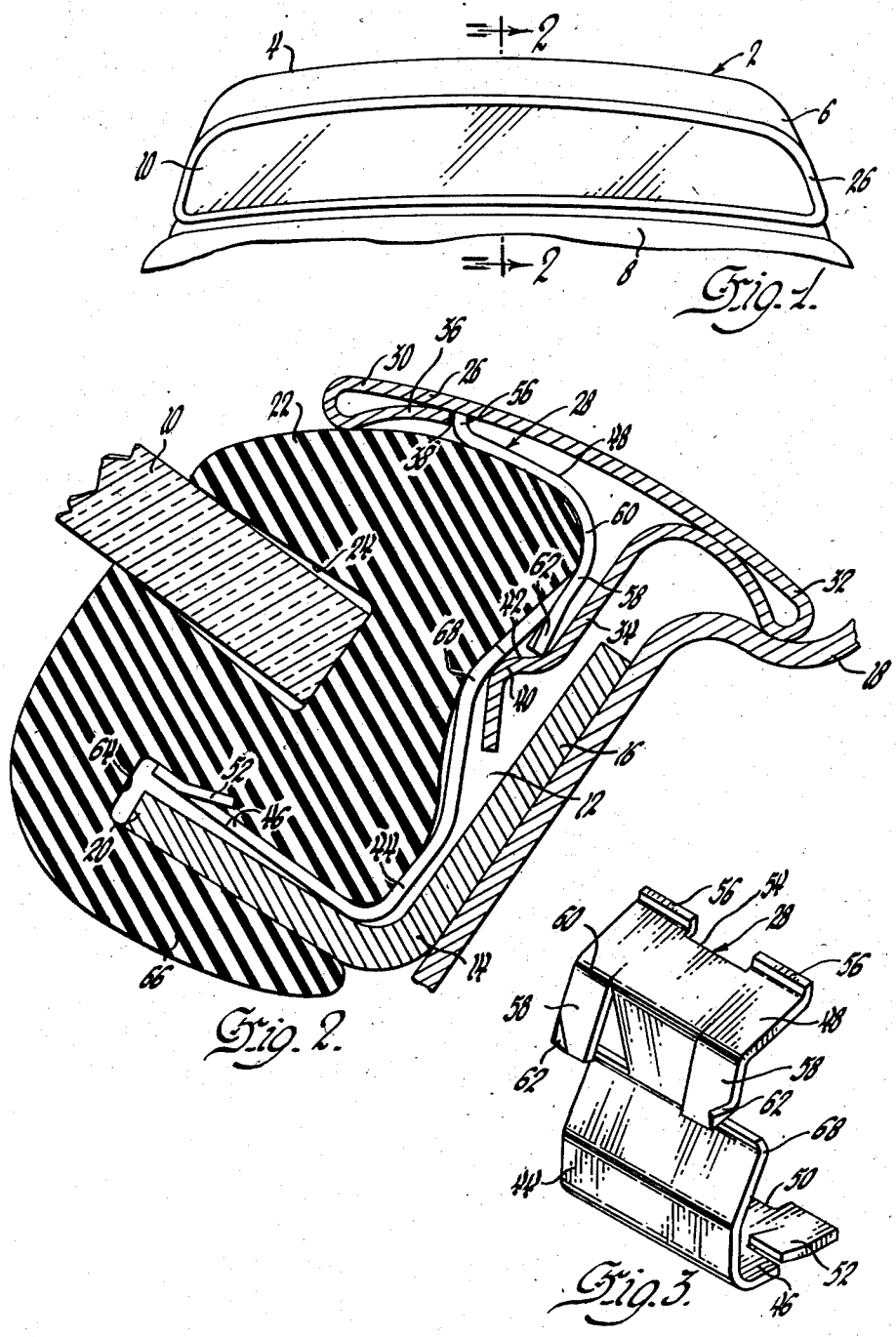
INVENTOR
Engelbert A. Meyer
BY
S. C. Thorpe
ATTORNEY May 21, 1957  E. A. MEYER  2,793,071
WINDOW CLIP ASSEMBLY FOR AUTOMOTIVE VEHICLES
Filed Nov. 29, 1954  2 Sheets-Sheet 2
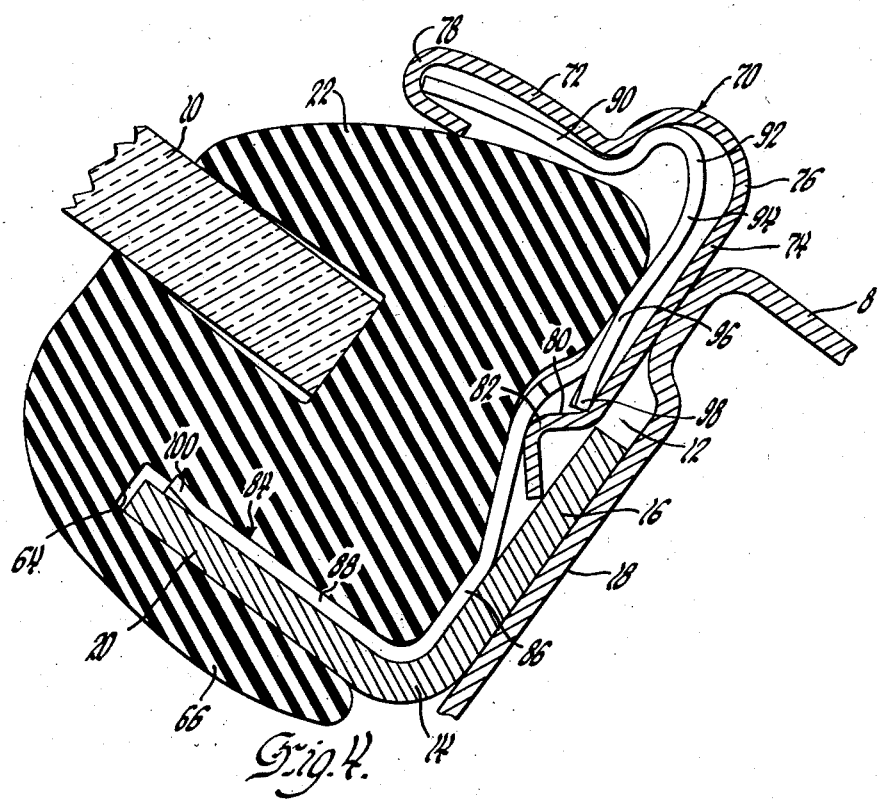
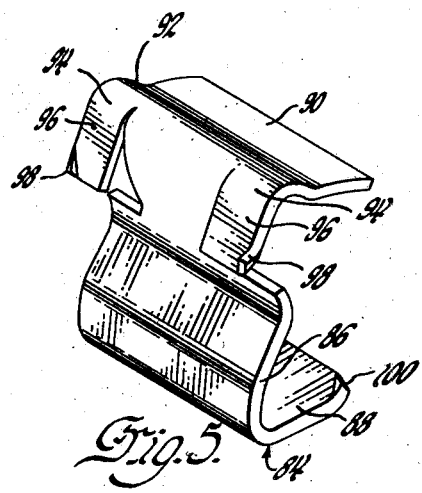
INVENTOR
Engelbert A. Meyer
BY
ATTORNEY

United States Patent Office 2,793,071
Patented May 21, 1957

2,793,071

WINDOW CLIP ASSEMBLY FOR AUTOMOTIVE VEHICLES

Engelbert A. Meyer, Detroit, Mich., assignor to General Motors Corporation, Detroit, Mich., a corporation of Delaware Application November 29, 1954, Serial No. 471,573

4 Claims. (Cl. 296—84)

This invention relates generally to clips and more particularly to clips adapted to secure trim members or reveal moldings as, for example, around the windows of an automotive vehicle.

The present invention is particularly adapted for preassembling the outer window reveal molding to the window and sealing ring so that the entire assembly may be installed from the outside of the car in order to obviate the difficulties encountered in attempting to install such windows from the inside of the vehicle. The clip concerns a specified sequence of procedure which involves first fitting a particular weatherstrip around the edge or periphery of the glass and then attaching the reveal molding by means of the clips to the subassembly of rubber and glass so that the entire assembly is ready for installation in the opening of the body from the outside thereof. While the clip which forms the main subject of the present invention is adapted to act in combination with a particular group of elements so as to make up a rear window assembly which represents a unique improvement over previous assemblies of this type, it will become apparent that the clip is also capable of general usage upon reference to the accompanying detailed description and drawings, in which:

Fig. 1 is a rear view of part of an automobile showing the rear window and its mounting.

Fig. 2 is a sectional view taken on the line 2—2 of Fig. 1.

Fig. 3 is a perspective view of the novel clip.

Fig. 4 is a sectional view similar to that of Fig. 2 showing a modified assembly and clip.

Fig. 5 is a perspective of the modified clip.

Referring first to Figs. 1, 2 and 3 the reference character 2 designates an automobile body comprising a top 4, sides 6 and outer rear panel 8. A window 10 is mounted in an opening 12 in the rear end of the vehicle between the top 4, sides 6 and the rear panel 8. The opening 12 has extending around the periphery thereof an angular member 14 having a lower flange portion 16 suitably secured to a portion 18 of the outer rear panel 8 extending inwardly of the vehicle and defining the outer periphery of the opening 12. Located on the member 14 inwardly of the vehicle and extending radially inwardly with respect to the opening 12 is a second flange portion 20. The window assembly which is pre-assembled for inserting in the opening 12 from the outside of the vehicle body comprises the aforementioned window 10 and a resilient weatherstrip or sealing ring 22 having a radial inwardly facing groove 24 in which the peripheral edge of the glass 10 is received. After the glass 10 has been placed in the radial inwardly facing groove of the sealing ring 22 a reveal molding 26 is attached to the sealing ring by means of unique clips indicated generally by a numeral 28 and to be described shortly. The reveal molding 26 is preformed of some relatively stiff sheet metal so that it has what amounts to three legs or flanges—a radially inwardly extending flange 30, a radially outwardly extending flange 32 and a flange 34 which for purposes of this description will be considered at more or less right angles to flanges 30 and 32 and when in assembled relation extends inwardly of the vehicle body 2. The free edge 36 of the radially inwardly extending flange 30 of the reveal molding 26 is bent over so that edge 36 forms a shoulder or abutment 38 facing more or less in the direction of the intersection between flanges 30 and 34. The free end of the flange 34 is provided with a ripple or bend 40 which forms a shoulder or abutment 42 whose abutting surface faces generally the intersection of the flanges 34 and 30.

Referring now particularly to Fig. 3, the unique clip 28 comprises a generally channel-shaped element made of a single piece of spring metal properly tempered after being lanced and formed and having a base portion 44 which intersects with a pair of oppositely disposed generally parallel legs 46 and 48. The free end of the leg 46 although relieved at 50 is generally rectangular in shape and has lanced therein and bent inwardly of the leg 46 a pair of tabs or bars 52 generally parallel and extending in the same direction generally toward the base 44 of the clip 28. The free end of the other leg 48 is also generally rectangularly shaped although relieved at 54 so as to form a pair of tabs 56. The base 44 of the clip 28 is lanced adjacent its intersection with leg 48 and adjacent opposite edges thereof so as to form a pair of oppositely disposed fingers or tabs 58 extending in the same general direction on the outside of the base 44. The tabs or fingers 58 which are parallel to each other form with the leg 48 a generally arcuate-shaped portion 60 which is spring-like and compressible. The free ends of the tabs or fingers 58 have the outer corners 62 bent over or downwardly so as to form interfering ends or barbs whose purpose will appear shortly.

Prior to assembling the reveal molding or trim member 26 to the resilient sealing ring or weatherstrip 22 the clips 28 are secured or "snapped" in place to the reveal molding 26. This is done by compressing the arcuate-shaped portions so that interfering tabs 56 on the free end of the leg 48 abut the shoulder 38 and the tabs or barbs formed by bending the outer corners 62 in the free end of the fingers or tabs 58 abut the shoulder 42 formed in the end of the flange portion 34 by the ripple 40. Due to the relative rigidity of the reveal molding 26 and the fact that the arcuate-shaped portion 60 tends to expand or straighten out thereby increasing the pressure against the abutting shoulders 38 and 42 the clips are maintained securely attached to the reveal molding 26. When the clips are in place in the molding 26 the molding and the clips are attached to the resilient ring or weatherstrip 22 by being "snapped" or otherwise secured into place so that the leg 46 is received in a radially outwardly facing groove 64. The pair of tabs or bars 52 on the leg 46 tend to prevent the withdrawal of the leg 46 in the groove 64 since these barbs or tabs interferingly engage one of the surfaces forming groove 64. After the reveal molding 26 and the clips 28 have been assembled to the sealing ring 22 the entire window assembly is inserted in the opening 12 from the outside of the vehicle and a lip 66 forming a side of the groove 64 is bent or flexed upwardly so that the radially inwardly directed flange portion 20 of member 14 is received in the groove 64 and the entire assembly is anchored in the opening 12 by lowering the flap or lip 66 over the portion 20. When the entire assembly is in place in the opening 12 it will be observed that the legs 46 of the clips 28 are located between the portion 20 of member 14 and the resilient sealing ring 22 toward the outside of the vehicle. It will further be observed that the fingers or flanges 34 of the reveal molding extend inwardly of the vehicle between the portion 16 and the bases 44 of the clips 28 below a ripple 68 provided in the clips.

From the foregoing description it may now be appreciated that a novel clip and assembly have been provided which enable the window, including the resilient sealing ring and the reveal molding, to be pre-assembled prior to final assembly in the opening of the body from the outside thereof.

Referring next to Figs. 5 and 6, an alternative clip structure is shown for a somewhat different trim or reveal molding appearing when assembled on the outside of the vehicle around the periphery of the rear window. The opening 12 in the vehicle body is formed in the same manner as in the previous design by means of the outer panel 8 bent to extend inwardly of the vehicle and having the reinforcing member 14 provided with the inwardly extending radial portion 20 and the portion 16 extending outwardly of the vehicle opening, the last-mentioned portion being, as before, secured in a suitable manner to the portion 18 of the outer rear panel 8. The reveal molding, which in the modification is designated by reference numeral 70, comprises in cross section a pair of flanges 72, 74 at approximately right angles and separated by a ripple 76. A pocket forming an abutting shoulder 78 is formed at the upper edge of the reveal molding by bending over the edge so that a space is provided between the extreme edge and the rest of the flange 72. As in the previous instance, a shoulder or abutting surface 80 is formed in the lower inwardly extending flange 74 by means of a ripple 82 adjacent the free edge thereof. The modified clip, which is indicated by reference character 84, is also substantially channel or U-shaped so as to have a base portion 86 and a pair of generally parallel legs 88 and 90 intersecting the base portion, the leg 90 being more or less separated from the base portion by a ripple 92 to increase the resiliency or springiness of the leg 90 with respect to the base portion 86. Lanced in the base portion 86 adjacent the ripple 92 and forming with the leg 90 an arcuate-shaped portion indicated by a numeral 94 are a pair of tabs or fingers 96 extending on the outside of the base 86 and parallel to each other in the same general direction. The tabs or fingers 96 have the corners 98 bent over so as to form interfering barbed ends. The free end of the leg 88 is generally rectangular in shape and has the corners thereof also bent inwardly so as to form interfering barbed ends 100.

The clips 84 are first "snapped" into place in the molding 70 by inserting the free end of the leg 90 in the pocket or abutting shoulder 78 and compressing the arcuate-shaped portion 94 until the tabs or fingers 96 abut the shoulder 80 formed on the free end of the flange 74. The entire assembly is then inserted into the opening 10 from the outside and secured over the reinforcement 14 in the manner already described with respect to the first embodiment of the invention.

I claim:

1. In combination with a vehicle and a window therefor, means for installing the window in an opening in the vehicle from the outside of the vehicle, said means comprising a flange on the periphery of the opening having a first portion extending inwardly of the vehicle and a second portion extending radially inwardly of the opening from the first portion, a sealing ring having a radially inwardly facing groove engaging the periphery of the window and a radially outwardly facing groove displaced inwardly of the vehicle from said first-mentioned groove and receiving the radially inwardly extending portion of the flange on the periphery of said opening, a plurality of channel-shaped clips having a pair of parallel tabs directed inwardly of the vehicle on one side of the base thereof, said base being adjacent and substantially parallel to the first portion of said flange, said tabs being between said base and said first portion, one of the legs of said clips being received in said radially outwardly facing groove adjacent said second portion and outwardly of the vehicle from said second portion, the other leg of said clip engaging the outer side of the sealing ring, and a molding having radially outwardly and inwardly extending portions and a portion extending inwardly of the vehicle and between the bases of said clips and the first portion of said flange, said radial inwardly extending portion and said portion extending inwardly of the vehicle of said molding having interfering shoulders adjacent the ends thereof, said tabs forming with the other of the legs of said clip a spring-like arcuate-shaped portion compressed so that the ends thereof interferingly engage said shoulders.

2. A clip for securing a member to a resilient support having a groove therein wherein said member has spaced engageable abutments, said clip comprising a channel-shaped element having a base intersecting a pair of parallel legs, a spring projection lanced in said base and extending outwardly therefrom so as to form with one of said legs an arcuate-shaped spring portion having ends interferingly engageable with said abutments when said portion is compressed therebetween, the other of said legs having a tab lanced therein and bent to one side thereof interferingly engageable with a surface forming said groove when said leg is received therein.

3. A clip for securing a member to a resilient support having a groove therein wherein said member has spaced engageable abutments, said clip comprising a channel-shaped element having a base intersecting a pair of parallel legs, a spring projection lanced in said base and extending outwardly therefrom so as to form with one of said legs an arcuate-shaped spring portion having rectangular ends with the ends bent so as to interferingly engage with said abutments when said portion is compressed therebetween, the other of said legs having a tab lanced therein and bent to one side thereof and extending in the general direction of the intersection of said other leg and said base, whereby said tab is interferingly engageable with a surface forming said groove when said leg is received therein.

4. A clip for securing a member to a resilient support having a groove therein wherein said member has spaced engageable abutments, said clip comprising a channel-shaped element having a base interesecting a pair of parallel legs, a spring projection lanced in said base and extending outwardly therefrom so as to form with one of said legs an arcuate-shaped spring portion having ends interferingly engageable with said abutments when said portion is compressed therebetween, the other of said legs having a rectangular free end with the corners thereof bent so as to be interferingly engageable with a surface forming said groove when said leg is received therein.

References Cited in the file of this patent

UNITED STATES PATENTS

| | | |
|---|---|---|
| 1,975,372 | Potter | Oct. 2, 1934 |
| 2,166,889 | Churchill | July 18, 1939 |
| 2,216,219 | Wiley | Oct. 1, 1940 |
| 2,229,233 | Wiley | Jan. 21, 1941 |
| 2,306,975 | Pender | Dec. 29, 1942 |
| 2,449,875 | Cadwallader | Sept. 21, 1948 |
| 2,655,239 | Kenlock | Oct. 13, 1953 |

FOREIGN PATENTS

| | | |
|---|---|---|
| 678,819 | Great Britain | Sept. 10, 1952 |